United States Patent [19]

Shaner

[11] 4,284,243

[45] Aug. 18, 1981

[54] LIQUID FERTILIZER DISTRIBUTOR

[76] Inventor: Jim Shaner, 5B, 925 - 30 St. NE., Calgary, Alberta, Canada, T2A 5L4

[21] Appl. No.: 111,475

[22] Filed: Jan. 11, 1980

[30] Foreign Application Priority Data

Sep. 28, 1979 [CA] Canada .................................. 336607

[51] Int. Cl.³ ............................ B05B 1/14; B05B 1/34
[52] U.S. Cl. ............................... 239/469; 137/561 A; 239/553.5
[58] Field of Search ................... 137/561 A; 222/478; 239/553, 553.5, 565, 463, 467, 468, 469

[56] References Cited

U.S. PATENT DOCUMENTS 791,425  5/1905  Johnson ................................ 222/478
2,827,210  3/1958  Ballard et al. ....................... 222/478

FOREIGN PATENT DOCUMENTS 867195  3/1971  Canada .

*Primary Examiner*—Andres Kashnikow
*Attorney, Agent, or Firm*—George H. Dunsmuir

[57] ABSTRACT

A distributor for viscous liquid fertilizer includes a casing with a flat top and frusto-conical bottom end defining a chamber the lower end of which is divided into compartments by radially extending partitions; a hollow cone spray nozzle in the top end of the casing for spraying fertilizer into the chamber and evenly distributing the fertilizer in the compartments; and an outlet duct in the bottom end of each compartment for discharging the fertilizer from the distributor.

2 Claims, 5 Drawing Figures

LIQUID FERTILIZER DISTRIBUTOR

FIELD OF THE INVENTION

This invention relates to a distributor for a viscous liquid and in particular to a distributor for viscous liquid fertilizers.

When spreading liquid fertilizer it is readily apparent that spreading should be as uniform as possible. Liquid distributors designed to ensure uniform distribution of liquids are disclosed, for example in U.S. Pat. Nos. 2,718,714, issued to J. J. Bocchino on Sept. 27, 1955; U.S. Pat. No. 3,479,146, issued to J. M. Hockman et al. on Nov. 18, 1969 and 3,848,635, issued to E. D. Scheffler, Jr. on Nov. 19, 1974. In general, distribution is effected by vanes, baffles or deflectors which direct the fluid into a plurality of passages for discharge through a plurality of outlets. The liquid is pumped into the inlet end of the distributor and distribution or spreading is effected by the baffles only. In the Scheffler patent, distribution is effected by means of a movable inlet fitting which can be aligned to varying degrees with a plurality of passageways to split the flow of fluid.

None of the devices disclosed by the above-mentioned patents is suitable for accurately dividing the flow of a highly viscous liquid into a plurality of flow paths in the manner desired by applicant. With the Bocchino device, it is unlikely that even distribution will occur. The Hochman et al distributor is not designed for use with viscous liquids; and the Scheffler apparatus is somewhat complicated, distribution being effected by offsetting of an inlet fitting.

The object of the present invention is to overcome the drawbacks of the prior art devices by providing a relatively simple, yet effective distributor for a viscous liquid.

SUMMARY OF THE INVENTION

Accordingly, the present invention relates to a distributor for a viscous liquid comprising a hollow casing including a cylindrical side wall and top and bottom walls; a plurality of partitions dividing the bottom of the interior of the casing into a plurality of compartments; said partitions extending radially between the longitudinal centre of said casing and said side wall, partitions extending longitudinally from said bottom wall to a level beneath said top wall; a hollow cone spray nozzle in the centre of said top wall for spraying liquid uniformly in a conical pattern, whereby substantially equal quantities of the liquid enter said compartments; and an outlet duct in said bottom wall at the bottom of each compartment for discharging the contents of the compartment from the distributor.

BRIEF DESCRIPTION OF THE DRAWINGS

The invention will now be described in greater detail with reference to the accompanying drawings, which illustrate a preferred embodiment of the invention, and wherein.

DESCRIPTION OF THE PREFERRED EMBODIMENT

Figure 2:
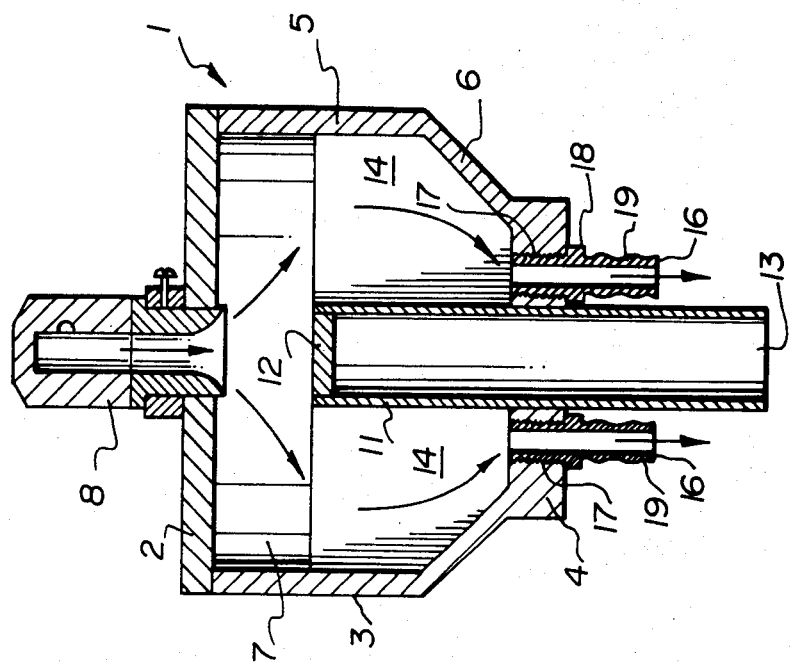
FIG. 2 is a longitudinal sectional view of the distributor of FIG. 1.

With reference to the drawings and in particular to FIGS. 1 to 4, the distributor of the present invention includes a casing generally indicated at 1. The casing 1 is defined by a top wall 2, a side wall 3 and a bottom wall 4 integral with the top wall 2. The side wall 3 is defined by a cylindrical upper portion 5 and a frusto-conical lower portion 6. The walls of the casing define a chamber 7 for receiving liquid fertilizer. The fertilizer is fed into the chamber 7 through a hollow cone spray nozzle 8. The nozzle 8 enters the center of the top wall 2, and is designed to spray liquid uniformly in a conical pattern into the chamber 7. The nozzle 8 includes an inlet duct 9 externally threaded at its outer end 10 for connecting the duct to a source of fluid under pressure.

A post 11 defined by a section of pipe extends upwardly through the bottom wall 4 of the casing 1 into the chamber 7. The post 11, which has a closed top end 12, is open at its bottom end 13 for mounting the distributor on an agricultural implement. A plurality of partitions 14 (FIGS. 2 and 3) extend radially outwardly from the post 11 to the side wall 3, dividing the lower portion of the chamber 7 into a plurality of compartments 15. The partitions 14 extend vertically or longitudinally in the casing 1 from the bottom wall 4 to the top end 12 of the post 11. The post 11 and partitions 14 have lengths approximately three-quarters the height of the casing 1.

Fluid in the compartments 15 are discharged via outlet ducts 16 in the bottom wall 4 of the casing 1. An outlet duct 16 is provided at the bottom end of each compartment 15. Each duct 16 includes an externally threaded upper end 17, a nut-shaped centre 18 and a ribbed bottom end 19. The bottom end 19 is provided with annular ribs or barbs for retaining one end of a hose.

Figure 5:
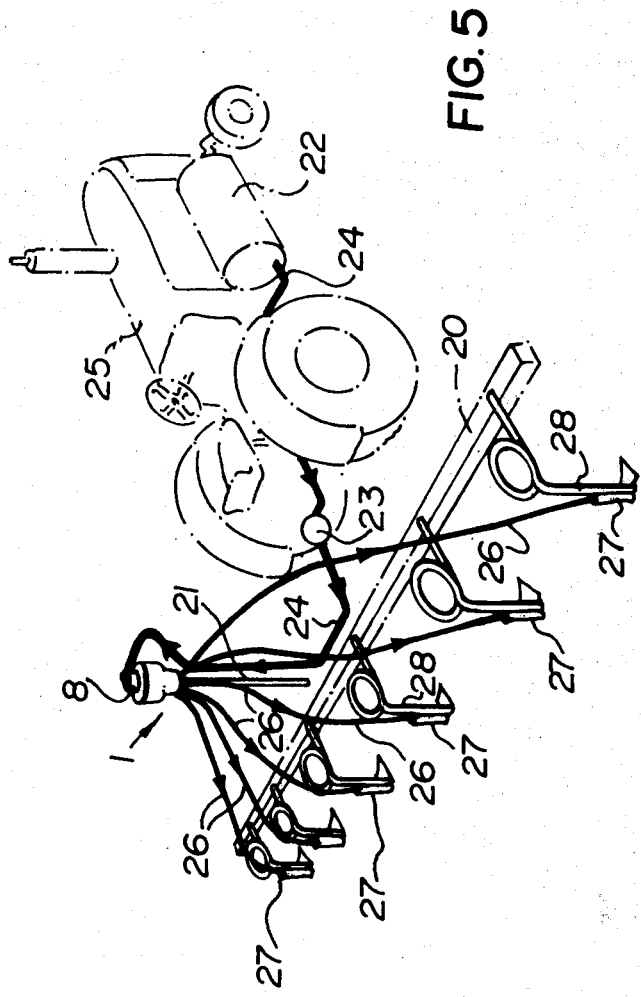
FIG. 5 is a schematic perspective view of the distributor of FIGS. 1 to 4 in use on a cultivator.

In use, the distributor is mounted on an agricultural implement such as a cultivator 20 (FIG. 5), the post 11 being placed on a rod 21. The inlet duct 9 of the spray nozzle 8 is connected to a fertilizer container 22 and a pump 23 by flexible tubing 24. The fertilizer container 22 and the pump 23 are mounted on tractor 25 used to tow the cultivator 20. Flexible tubes 26 connect the outlet ducts 16 to metal spreader tubes 27 on shanks 28 of the cultivator blades. Fertilizer is pumped from the container 22 into the casing 1, via the inlet duct 9.

Figure 1:
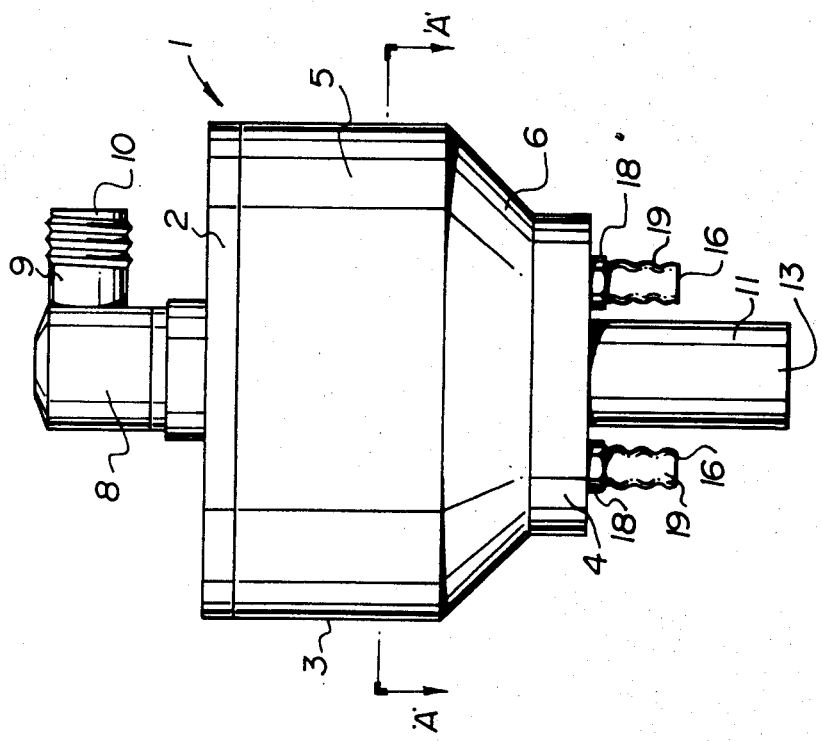
FIG. 1 is an elevation view of a distributor for viscous liquids in accordance with the present invention.
Figure 4:
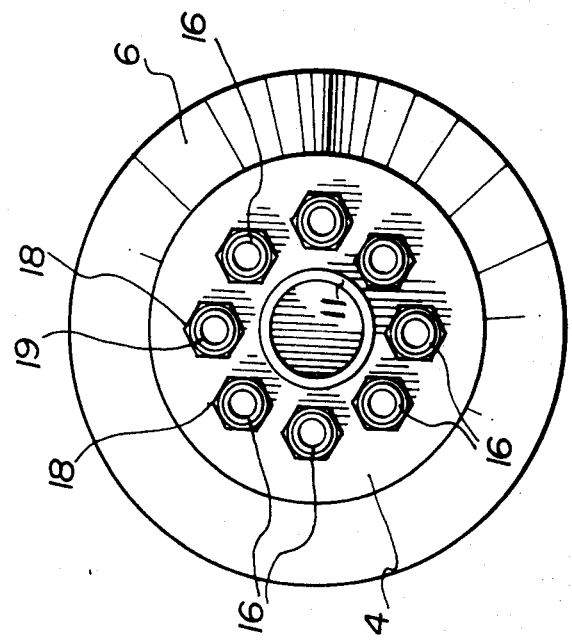
FIG. 4 is a bottom view of the distributor of FIGS. 1 to 3.
Figure 3:
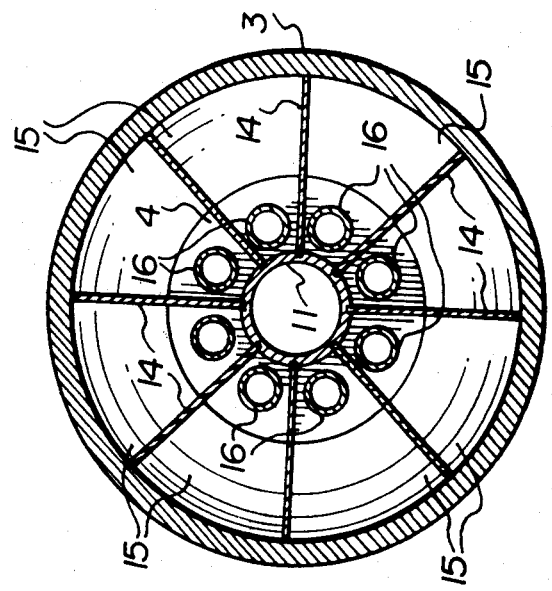
FIG. 3 is a cross-sectional view of the distributor taken generally along line A—A of FIG. 1.

As shown clearly in FIG. 1, the duct 9 enters the nozzle 8 tangentially which causes the spiral movement of the fertilizer. The spiral movement of the fertilizer promotes even distribution of the fertilizer into the component 15. The hollow cone spray nozzle 8 itself promotes even, wide distribution of the fertilizer. The flat top end 12 of the part 11 spreads any fertilizer falling onto the part. The hollow cone spray nozzle is considered essential for application of viscous fertilizer.

What I claim is:

1. A distributor for a viscous liquid comprising a hollow casing including a side wall defined by a cylindrical upper portion and a frusto-conical lower portion, a top wall and a bottom wall; a plurality of partitions dividing the bottom of the interior of the casing into a plurality of compartments, said partitions extending radially between the longitudinal centre of said casing and said side wall to a level beneath said top wall; a hollow cone spray nozzle in the centre of said top wall for spraying liquid uniformly in a conical pattern, whereby substantially equal quantities of the liquid enter said compartments; an inlet duct for introducing liquid into said nozzle tangentially to promote a spiral action and even distribution of the liquid; a hollow centre post with a closed, planar top end extending through the bottom end of said casing for mounting the distributor on an agricultural machine, said partitions extending radially between said post and said side walls; and an outlet duct in said bottom wall at the bottom of each compartment for discharging the contents of the compartment from the distributor.

2. A distributor according to claim 1, wherein said partitions extend longitudinally upwardly from said bottom wall approximately three-quarters the height of the casing.

* * * * *